(12) United States Patent
Slavin

(10) Patent No.: US 9,692,319 B1
(45) Date of Patent: Jun. 27, 2017

(54) POWER SYSTEM ISLANDING DETECTION WITH WAVEFORM FITTING

(75) Inventor: Keith Slavin, Beaverton, OR (US)

(73) Assignee: SunPower Corporation, San Jose, CA (US)

( * ) Notice: Subject to any disclaimer, the term of this patent is extended or adjusted under 35 U.S.C. 154(b) by 283 days.

(21) Appl. No.: 12/907,741

(22) Filed: Oct. 19, 2010

Related U.S. Application Data

(60) Provisional application No. 61/291,622, filed on Dec. 31, 2009.

(51) Int. Cl.
*H02M 7/48* (2007.01)

(52) U.S. Cl.
CPC .................................. *H02M 7/4807* (2013.01)

(58) Field of Classification Search
CPC .......................................................... H03F 1/33
USPC ................ 702/60, 64, 66, 70, 71, 73, 74, 75
See application file for complete search history.

(56) References Cited

U.S. PATENT DOCUMENTS

| | | | |
|---|---|---|---|
| 6,219,623 B1* | 4/2001 | Wills ............................... | 702/60 |
| 7,151,539 B2* | 12/2006 | Slavin ........................... | 345/440 |
| 7,427,815 B1* | 9/2008 | Ye et al. ........................ | 307/127 |
| 2002/0140704 A1* | 10/2002 | Slavin ........................... | 345/589 |
| 2004/0186669 A1* | 9/2004 | Benmouyal .................... | 702/57 |
| 2005/0135031 A1* | 6/2005 | Colby et al. ................... | 361/78 |
| 2005/0187752 A1* | 8/2005 | Colby et al. ................... | 703/19 |
| 2005/0254191 A1* | 11/2005 | Bashaw et al. ................ | 361/62 |

OTHER PUBLICATIONS

Handel, P., "Properties of the IEEE-STD-1057 four parameter sine wave fit algorithm", Department o Signals Sensors and Systems, Royal Institute of Technology, Jun. 2000, pp. 1-5.*

Wolfgang Damm, Time Matters—How Power Meters Measure Fast Signals, Sep. 9, 2008, RF Globalnet (www.rfglobalnet.com) newsletter, pp. 1-6.*

Bower, W., et al., "Evaluation of Islanding Detection Methods for Utility-Interactive Inverters in Photovoltaic Systems," Sandia Report, Sandia National Laboratories, Nov. 2002, 60 pages.

Ghoshal, A. et al., "A Method to Improve PLL Performance Under Abnormal Grid Conditions," Department of Electrical Engineering, Indian Institute of Science, 2007, 7 pages.

Handel, P., "Properties of the IEEE-STD-1057 four parameter sine wave fit algorithm," Department of Signals, Sensors and Systems, Royal Institute of Technology, Jun. 2000, 5 pages.

Karimi-Ghartemani, M. et al., "Wide-range, fast and robust estimation of power system frequency," Department of Electrical and Computer Engineering, Centre for Applied Power Electronics, Jul. 22, 2002, 9 pages.

(Continued)

*Primary Examiner* — Manuel Rivera Vargas

(74) *Attorney, Agent, or Firm* — Barnes & Thornburg LLP

(57) ABSTRACT

A method includes generating samples of a grid parameter at a point of common coupling, fitting a waveform to the samples, and detecting an islanding condition in response to a parameter of the waveform. The waveform may be fit to the samples using a nonlinear algorithm. A controller includes a waveform fitting circuit to fit a waveform to samples of a grid parameter, an inverter controller to generate one or more switching signals to control an inverter in response to an error signal, and an error generator arranged to generate the error signal in response to a parameter of the waveform.

25 Claims, 3 Drawing Sheets

(56) References Cited

OTHER PUBLICATIONS

Ostrem, T. et al., "Grid Connected Photovoltaic (PV) Inverter with Robust Phase-Locked Loop (PLL)," 2006 IEEE PES Transmission and Distribution Conference and Exposition Latin America, Venezuela, 7 pages.

Roncero-Sanchez, P. et al., "A fast frequency estimation method for balanced three-phase systems with harmonic distortion," Power Electronics and Applications, 2009, EPE '09, 13th European Conference, 9 pages.

Yan, Z. et al., "Two-loop control strategy for three-phase grid-connected photovoltaic system with LCL filter," Huazhong University of Science and Technology, 2008, 5 pages.

\* cited by examiner

POWER SYSTEM ISLANDING DETECTION WITH WAVEFORM FITTING

CROSS-REFERENCE TO RELATED APPLICATIONS

This application claims priority from U.S. Provisional Patent Application Ser. No. 61/291,622 titled Phase Recovery in Power Systems filed Dec. 31, 2009.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Electric utility grids have traditionally been arranged so that power flows radially outward from a centrally located power plant to multiple points of usage. The increasing use of renewable power sources, however, has introduced distributed generation (DG) capacity to power grids. DG power sources may be located anywhere on the grid, typically close to a local power load. Examples of DG power sources include photovoltaic (PV) panels and wind turbines which are scattered at customer locations throughout the grid. At certain times, all of the power from these sources may be consumed by local building loads, while at other times, excess power is fed back into the grid. Thus, utility grids have become complex, interconnected structures with power flowing in multiple directions depending on the availability of power from multiple sources and demand from multiple loads at any specific time.

Distributed power sources must include synchronization functionality to enable power from the distributed source to be injected into the grid in phase with the power already flowing in the grid. Most commonly, this functionality is implemented with a phase-locked loop (PLL) which generates a local sine wave reference having the same phase and frequency as the power grid. This reference is then used to inject current in phase with the grid.

"Islanding" is a condition in which a portion of the utility grid containing power generation capacity and load becomes isolated from the remainder of the grid, but continues to operate independently because the PLL or other synchronization functionality continues to provide a reference for the power flowing in the isolated portion of the grid. Islanding is problematic, however, because it typically degrades the quality of power flowing in the isolated portion of the grid, creates unsafe conditions for utility workers, causes mismatches when the isolated portion of the grid is eventually reconnected to the main grid, and may cause numerous other problems including mismatches between power generation capacity and demand. Thus, if an islanding condition is detected, the local power generation capacity should be disconnected. This is referred to as anti-islanding (AI) protection, and the detection of islanding conditions is an ongoing challenge.

Numerous islanding detection techniques have been developed. Some of the most effective techniques involve the use of positive feedback in the distributed generation control system. A common method is to place a narrow-band low-pass filter and amplification in the grid voltage measurement and current injection feedback loop, with sufficient gain to provide a low frequency (<grid frequency) instability and oscillation that builds up when the grid is disconnected, and dampens down when the grid is connected. Noise seeds the oscillation growth.

FIG. 1 illustrates a prior art distributed generation control system having a positive feedback anti-islanding feature. An inverter bridge 10 converts DC power from a DC power source 12 to AC power which is delivered to a local load 14 and utility grid 16 at a point of common coupling (PCC) 18. A disconnect switch 20 or utility circuit breaker/recloser may isolate the local load 14 from the utility grid 16 in response to one or more fault conditions.

The normal negative feedback loop includes a phase-locked loop 22 which generates frequency ($\omega$) and phase ($\theta$) reference signals in response to the output voltage $v_a$ from the inverter at the point of common coupling. An error generator 24 generates a feedback signal ERROR in response to a sample of the output current $i_a$ and a current reference signal $i_{REF}$. A pulse width modulation (PWM) circuit 26 generates switching signals to control the inverter bridge in response to the signals from the error generator and PLL.

The positive feedback portion of the control system includes a low-pass or band-pass filter 28, an amplifier 30 that determines the loop gain, and a summing circuit 32. In the absence of the positive feedback loop, the PLL and negative feedback loop through error generator 24 would cause the inverter to continue operating long after the inverter and local load are isolated from the utility grid (islanded). The phase and/or frequency of the PLL, however, would slowly drift until a problematic condition develops.

The positive portion of the feedback loop introduces a small amount of positive feedback through summing circuit 32. When the inverter and local load are connected to the utility grid, the low impedance of the grid overcomes the effect of the positive feedback, and the output of the inverter remains stable. When the inverter and local load are disconnected from the utility grid, however, the positive feedback loop causes one or more parameters of the inverter output to grow, decay or oscillate until it trips a protection feature such as over/under voltage protection (OVP/UVP), over/under current protection (OCP/UCP), or over/under frequency protection (OFP/UFP) which is included in the control system, but not shown in FIG. 1.

Although prior art positive feedback anti-islanding techniques such as the one illustrated in FIG. 1 may provide adequate performance in some situations, they suffer from some drawbacks. For example, the presence of the filter in the positive feedback loop causes a significant amount of loop delay which slows down the response to an islanding condition. The positive feedback loop typically provides a 20 Hz oscillation in response to an islanding condition which results in a time constant that may be too long to trigger a shutdown during the time periods mandated by utility grid interconnect standards and regulations. The system of FIG. 1 may also have difficulty re-synchronizing when grid power is restored.

DETAILED DESCRIPTION

Figure 2:
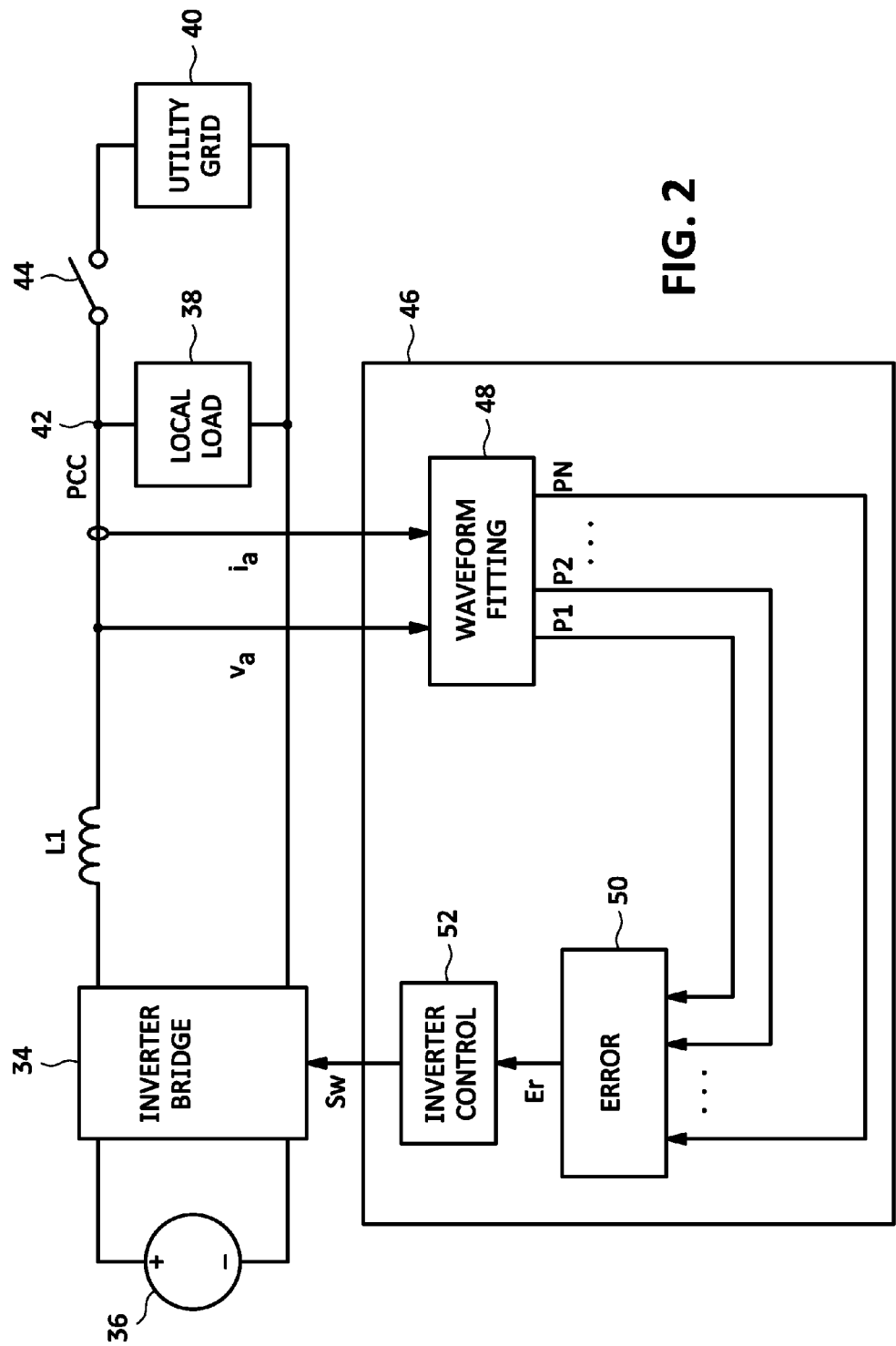
FIG. 2 illustrates an embodiment of a control system according to some inventive principles of this patent disclosure.

FIG. 2 illustrates an embodiment of a control technique according to some inventive principles of this patent disclosure. The system of FIG. 2 includes an inverter bridge 34, a DC power source 36, a local load 38, a grid 40, a point of common coupling 42 and a disconnect switch 44 or utility circuit breaker/recloser.

Figure 1:
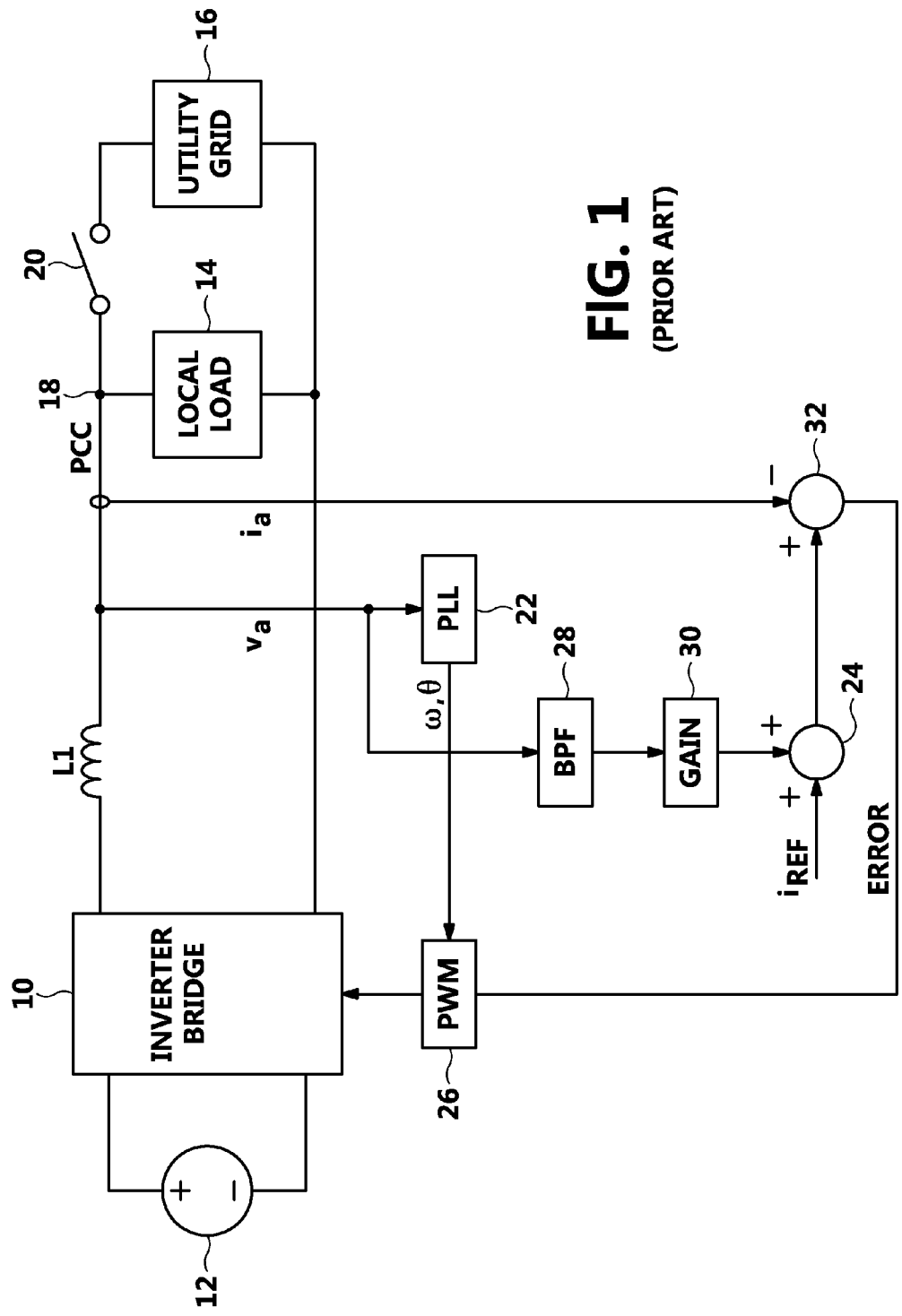
FIG. 1 illustrates a prior art distributed generation control system having a positive feedback anti-islanding feature.

Rather than a phase-locked loop, however, the controller 46 in the system of FIG. 2 includes waveform fitting functionality 48 that generates one or more parameters P1, P2 . . . PN by fitting samples of one or more inputs, such as the inverter output voltage $v_a$ or current $i_a$, to a waveform such as a sinewave or other suitable waveform. An error generator 50 generates an error signal Er in response to one or more of the waveform parameters P1, P2 . . . PN. The error signal Er is used by inverter control 52 to generate one or more switching signals Sw to control the inverter bridge 34, which converts DC power from DC power source 36 to AC power as in the circuit of FIG. 1.

Figure 3:
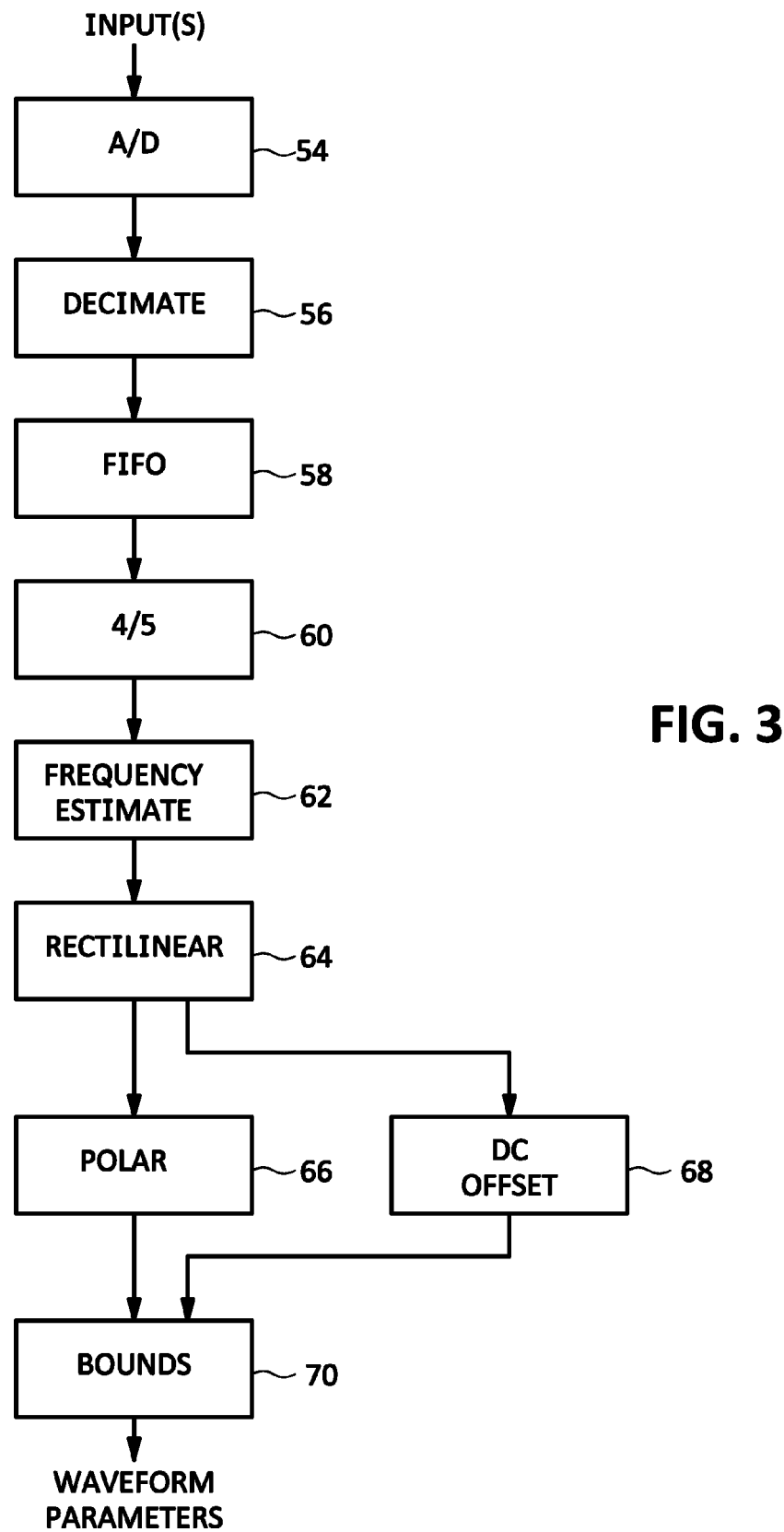
FIG. 3 illustrates an embodiment of a waveform fitting system according to some inventive principles of this patent disclosure.

FIG. 3 illustrates an embodiment of a waveform fitting system according to some inventive principles of this patent disclosure. The embodiment of FIG. 3 will be described in the context of some example implementation details, and it may be used, for example, to implement the waveform fitting functionality 48 of FIG. 2, but the inventive principles are not limited to these specific details or applications.

The system of FIG. 3 may be used to generate any or all of the following four unknown parameters for a sinusoidal waveform $$f(t)=A*\sin(\omega t+\theta)+B \qquad \text{Eq. 1}$$

where:
A=the amplitude of the sine wave;
$\omega=2\pi f$ (radians/sec) is the angular frequency of the sine wave;
θ=the phase in radians; and
B is the DC offset.

The angular frequency co and the phase θ are sometimes indicated as w and p, respectively, for convenience such as in computer source code.

An analog-to-digital converter 54 samples one or more inputs at a relatively high sample rate such as 100 KHz. A decimation filter 56 implements a low-pass filter by decimating the samples by $2^7*3=384$ to generate filtered samples at a lower sample rate of about 260 Hz. Selecting a lower sample rate which nevertheless exceeds 3 times the grid frequency ($>=3*f_{grid}=180$ Hz for a 60 Hz grid) avoids Nyquist aliasing issues.

A first-in-first-out (FIFO) buffer 58 stores five lower rate samples for processing by the waveform fitting algorithm. An offset function 60 selects a quad of 4 out of the 5 samples stored in the FIFO to avoid ill-behaved results from a denominator that may be close or equal to zero as described below.

A frequency estimator 62 uses the quad of samples f(0) through f(3) to calculate the frequency ω of the input signal as follows:

$$\omega = \arccos\left(\frac{f(3)-f(0)}{f(2)-f(1)}\bigg/2\right) \qquad \text{Eq. 2}$$

The denominator in Eq. 2 may be zero or close to zero resulting in a degenerate, or at least ill-behaved result. Thus, the offset function 60 selects a quad of 4 out of the 5 samples that provide the largest denominator.

A rectangular coordinate calculator 64 uses the estimated frequency co and samples f(0) through f(2) to calculate the following two functions of A and θ on a rectangular grid:

$$a\_sin\_p = A\sin(\theta) = \frac{f(2)+f(0)-2f(1)}{2\cos((\omega)-1)} \qquad \text{Eq. 3}$$

$$a\_cos\_p = A\cos(\theta) = \frac{f(2)-f(0)}{2\sin(\omega)} \qquad \text{Eq. 4}$$

A rectangular-to-polar converter 66 converts the rectangular results to polar form to obtain A and θ as follows:

$$A=\sqrt{(a\_sin\_p)^2+(a\_cos\_p)^2} \qquad \text{Eq. 5}$$

$$\theta=\arctan(a\_sin\_p/a\_cos\_p) \qquad \text{Eq. 6}$$

where Eq. 6 is derived from $\tan(\theta)=(a\_sin\_p)/(a\_cos\_p)$.

DC offset calculator 68 calculates the DC offset as follows:

$$B=f(0)-a\_sin\_p \qquad \text{Eq. 7}$$

Finally, bounding functionality 70 may implement over/under voltage, current, frequency, etc., checks to turn off the inverter bridge (disconnecting the inverter from the grid) if any of the calculated parameters exceeds any predetermined values.

Any of the functionality illustrated in FIG. 3 may be implemented in hardware, software, firmware or any combination thereof. For example, in an inverter system having control functionality implemented with digital signal processor (DSP), the functionality illustrated in FIG. 3 may all be implemented as software as described in Appendix A with no additional hardware required.

The low-pass decimating filter may be made nominally flat to the grid frequency with significant attenuation (which may be set for example to 70 db) at the harmonics of 60 Hz (i.e. >=120 Hz). For a 50 Hz/60 Hz system, the filter cutoff could be at 100 Hz instead. The sinewave parameters may then be used to reconstruct a "locked" sine reference, similar to that generated by a PLL. However, because there is not a PLL that is trying to build a frequency and phase reference, there may be several potential advantages.

A first potential advantage of the inventive principles is a fast "lock-up" time. The delay is almost entirely due to low-pass filtering of harmonics of the grid frequency prior to input to the algorithm. Once five filtered points are available for the algorithm to generate a sine fit, "lock-up" is effectively instantaneous. There may be no need for additional filtering in a feedback loop which could cause additional delay.

A second potential advantage of the inventive principles is that the non-linear nature of the recovery algorithm makes the control loop inherently unstable. Without an active power grid, the behavior may become more and more chaotic, and with time, can be easily characterized as out of legal amplitude, frequency, or DC offset bounds. This then triggers disconnection (anti-islanding) from the grid. Under these conditions, the disconnect time, due to the noisy nature of the process, increases only slightly with an increasing number of inverters in parallel. For example, a disconnect in about 0.2 seconds may be achieved, which is about 10 times quicker than the upper time limit of 2 seconds specified by typical standards for a single unit under test.

During operation, the algorithm may be arranged to check for out-of-range values of A and $\omega$, and switch off driving the grid if one or the other becomes out of bounds (anti-islanding). Whether driving the grid or not, the system may continue monitoring the grid, so that when grid power is resumed, good values of A and $\omega$ may be obtained again, and if within bounds for, e.g., 300 seconds, the system may resume injecting power back into the grid, as required by typical standards.

Appendix A illustrates an example of code that may be used to generate and return of new parameters by implementing the algorithm described above in the context of FIG. 3.

The inventive principles of this patent disclosure have been described above with reference to some specific example embodiments, but these embodiments can be modified in arrangement and detail without departing from the inventive concepts. Such changes and modifications are considered to fall within the scope of the following claims.

Appendix A

C code, called on each new input sample (260 times/sec from above), and generating and returning the four new parameters:

ampl=A, phase=p, offset=B, and w.

```
/* C code start */
void Phase_Recovery(double input, double *ampl, double *w, double *phase,
                    double *offset)
{
  static double sm[5] = {0, 0, 0, 0, 0};

sm[4] = sm[3];
  sm[3] = sm[2];
  sm[2] = sm[1];
  sm[1] = sm[0];
  sm[0] = input;

double ax, wx, px, bx;

int16 d;
  if(fabs(sm[1] - sm[2]) < fabs(sm[2] - sm[3]))
     d = 1;  /* offset indices to use second quad out of 5 samples */
  else
     d = 0;  /* otherwise use first quad out of 5 samples */
  double cosw =
     ((sm[3+d] - sm[d]) / (sm[2+d] - sm[1+d]) - (double) 1.0 * (double) 0.5;
  if(fabs(cosw) < (double) 1.0)
    {
      wx = acos(cosw);
      double num = sm[2+d] + sm[d] - (double) 2.0 * sm[1+d];
      double denom = (double) 2.0 * (cosw - (double) 1.0);
      double a_sin_p = num / denom;
      double a_cos_p = (sm[2+d] - sm[d]) / ((double) 2.0 * sin(wx));
      ax = sqrt(a_sin_p * a_sin_p + a_cos_p * a_cos_p);
      px = atan2(a_sin_p, a_cos_p);
      bx = sm[1+d] - a_sin_p;
      /* correct phase for the index offset based on the selected quad */
      px -= (double) d * wx;
    }
  else
    {
      ax = wx = px = bx = (double) 0.0;
    }
  *ampl = ax;
  *w = wx;
  *phase = px;
  *offset = bx;
}
/* C code end */
```

The invention claimed is:

1. A method comprising:
   generating, with a controller, four temporally consecutive samples of a signal of a utility grid at a point of common coupling between a local load and the utility grid, wherein a sampling rate of the controller is at least three times a frequency of the utility grid;
   determining parameters of a sinusoidal waveform as a function of the four temporally consecutive samples;
   controlling, based on the parameters of the sinusoidal waveform, a signal of an inverter bridge;
   detecting an islanding condition in response to at least one of the parameters of the sinusoidal waveform surpassing a threshold; and
   triggering, by the controller, a disconnection of the inverter bridge from the utility grid in response to detecting the islanding condition.

2. The method of claim 1, further comprising controlling an AC power source coupled to the point of common coupling as a function of the parameters of the sinusoidal waveform.

3. The method of claim 2, wherein controlling the AC power source comprises controlling an inverter of the AC power source.

4. The method of claim 2, wherein controlling the AC power source comprises synchronizing an AC power of the AC power source to the signal of the utility grid as a function of the parameters of the sinusoidal waveform.

5. The method of claim 1, wherein determining the parameters of the sinusoidal waveform comprises estimating the frequency of the sinusoidal waveform.

6. The method of claim 5, wherein determining the parameters of the sinusoidal waveform comprises estimating the frequency of the sinusoidal waveform using an arccosine function.

7. The method of claim 1, wherein determining the parameters of the sinusoidal waveform comprises determining the parameters using a nonlinear algorithm.

8. The method of claim 1, wherein determining the parameters of the sinusoidal waveform comprises calculating a DC offset of the sinusoidal waveform.

9. The method of claim 1, wherein generating the four temporally consecutive samples comprises generating four temporally consecutive samples of a voltage signal of the utility grid at the point of common coupling.

10. The method of claim 1, wherein generating the four temporally consecutive samples comprises generating four temporally consecutive samples of a current signal of the utility grid at the point of common coupling.

11. The method of claim 1, wherein determining the parameters of the sinusoidal waveform comprises determining an amplitude of the sinusoidal waveform.

12. The method of claim 1, further comprising disconnecting a local power generation capacity from the point of common coupling in response to the islanding condition.

13. The method of claim 1, further comprising:
   generating a fifth temporally consecutive sample subsequent to the four temporally consecutive samples; and
   determining the parameters of the sinusoidal waveform as a function of three of the four temporally consecutive samples and the fifth consecutive sample in response to the four temporally consecutive samples resulting in an undefined parameter.

14. The method of claim 1, wherein determining the parameters of the sinusoidal waveform comprises determining a phase of the sinusoidal waveform.

15. The method of claim 1, wherein surpassing the threshold value comprises at least one of rising above a first threshold value or falling below a second threshold value.

16. A system comprising:
   an inverter bridge coupled to a point of common coupling with a utility grid; and
   a controller coupled to the inverter bridge and to (i) generate four temporally consecutive samples of a signal of the utility grid at the point of common coupling, wherein a sampling rate of the controller is at least three times a frequency of the utility grid, (ii) determine parameters of a sinusoidal waveform as a function of the four temporally consecutive samples, (iii) control, based on the parameters of the sinusoidal waveform, a signal of the inverter bridge to inject current from a local power source to the point of common coupling in phase with the grid, (iv) detect an islanding condition in response to at least one of the parameters of the sinusoidal waveform surpassing a threshold value, and trigger, by the controller, a disconnection of the inverter bridge from the utility grid in response to the islanding condition.

17. The system of claim 16, wherein to determine the parameters of the sinusoidal waveform comprises to estimate the frequency of the sinusoidal waveform.

18. The system of claim 17, wherein to estimate the frequency of the sinusoidal waveform comprises to use an arccosine function.

19. The system of claim 16, further comprising a local load coupled to the point of common coupling.

20. The system of claim 16, wherein to determine the parameters of the sinusoidal waveform comprises to calculate a DC offset for the sinusoidal waveform.

21. A controller comprising:
   a waveform fitting circuit to (i) generate four temporally consecutive samples of a signal of a utility grid, wherein a sampling rate of the controller is at least three times a frequency of the utility grid, (ii) determine parameters of a sinusoidal waveform as a function of the four temporally consecutive samples; and (iii) control, based on the parameters of the sinusoidal waveform, a signal of an inverter bridge to inject current from a local power source in phase with the grid; and
   an error generator to generate an error signal in response to at least one of the parameters of the sinusoidal waveform surpassing a threshold value.

22. The controller of claim 21, wherein the waveform fitting circuit comprises a frequency estimator.

23. The controller of claim 22, wherein the frequency estimator implements an arccosine function.

24. The controller of claim 21, wherein to determine the parameters of the sinusoidal waveform comprises to use a nonlinear algorithm to determine the parameters.

25. The controller of claim 21, further comprising an inverter controller to generate one or more switching signals to control an inverter to disconnect the inverter from a point of common coupling between a local load and the utility grid in response to receipt of the error signal.

* * * * *